Patented May 5, 1931

1,803,445

UNITED STATES PATENT OFFICE

GORDON R. WALPER, OF ROYAL OAK, MICHIGAN

WALL PLASTER

No Drawing.   Application filed December 22, 1928.   Serial No. 328,063.

In the United States patent to Curry Ora Walper, No. 1,608,148 of November 23, 1926, is described a wall plaster consisting of a mixture of coarsely ground grains with the ordinary pulverized plaster of Paris. It is also stated in this patent that sand may be added to these materials, and as a matter of fact an addition of sand is desirable in some instances. Such an addition of sand, however, involves certain objection. In the first instance the sand, in order to be incorporated in a dry mixture, must previously be dried at one time or another. Secondly, where sand is used there is always the danger that an unscrupulous builder will unauthorizedly add sand to the mixture, thereby reducing the cost for his own benefit but at the same time impairing the qualities of the resulting plaster. If an excess of sand is detected, the explanation is offered that the mixture was delivered to the job in such condition. Consequently it is almost impossible to fix the blame although the cause of the trouble may be definitely known.

In order to avoid these two difficulties pertaining to sand-mixed plaster, I have found that coarsely ground shale taken from the gypsum mine at the sides of the gypsum vein may be used instead of sand. With regard to the first objection stated above, although the shale occurs in nature in a moist state as does the gypsum, it may be dried in the regular course of calcining the gypsum and therefore requires no separate drying operation. The elimination of drying ovens for sand and the avoidance of transportation incident to the drying operation is of great economic importance to the industry. As to the second objection, the unscrupulous builder cannot adulterate the plaster mix by addition of more shale than specified, for the reason that this shale is not available locally but only at the plaster mine, which is not accessible to builders in the ordinary course. Sand added to the mixture would, of course, be readily visible and determinable, for the mixture as supplied contains no ordinary sand such as river or pit sand.

The binding properties of the mixture are acquired by the use of finely ground calcined gypsum or plaster of Paris as usual, but the internal support usually obtained by the use of sand is obtained in the present invention by the use of comparatively coarse ground shale, preferably in different sizes, with or without the use of coarsely ground gypsum such as described in the above mentioned patent.

Although the proportions of materials may vary within wide limits, according to the qualities desired in the final mixture, the following examples will illustrate in a general way the nature and amounts of the ingredients:

Example 1

Fine calcined gypsum—under 100 mesh _____ 20%
Coarse gypsum—over 40 mesh _____ 20%
Coarse gypsum—over 60 mesh _____ 25%
Coarse gypsum—over 100 mesh _____ 15%
Shale—over 40 mesh _____ 20%

Example 2

Commercial calcined gypsum, containing
  100, 80 and 60 mesh _____ 25% to 33⅓%
Shale—over 40 mesh _____ 75% to 66⅔%

The fine calcined gypsum is the fine ingredient of the commercial gypsum ordinarily used in mixing wall plaster. In the first example the various grades of coarse gypsum are such as will be retained by the screens described in connection therewith; and although it is stated, for example, that 15% is over 100 mesh, this means that the 15% is between 100 mesh and the next grade or 60 mesh, for, strictly speaking, all grades of the coarse gypsum are over 100 mesh. The quantity of gypsum over 60 mesh (25%) is to be understood in the same way.

As already stated, the proportions of ingredients may vary widely according to the nature of the product desired, and in the first example the amount of shale, for instance, may be as high as 30% or more. In the second example the binding quality of the product is proportional to the ratio of fine gypsum used therein, and this applies also to the first example and generally in the art of mixing plaster. It will be understood therefore that the invention is not restricted to definite proportions of materials or even to the exclusive use of gypsum and shale. The permissible variations in mixing plasters are well known, and further, there is nothing in the present invention to preclude the addition of other materials or coloring matter in order to obtain special properties that may be desired.

What I claim is:—

A mixture for plaster comprising powdered calcined gypsum, coarser particles of virgin gypsum shale of such a size as to provide internal support, and particles of gypsum calcined of substantially the same size.

In testimony whereof I affix my signature.

GORDON R. WALPER.